Sept. 27, 1955  N. B. NICHOLS  2,718,794
LINKAGE FOR INDICATING AND CONTROLLING INSTRUMENTS
Filed May 31, 1951
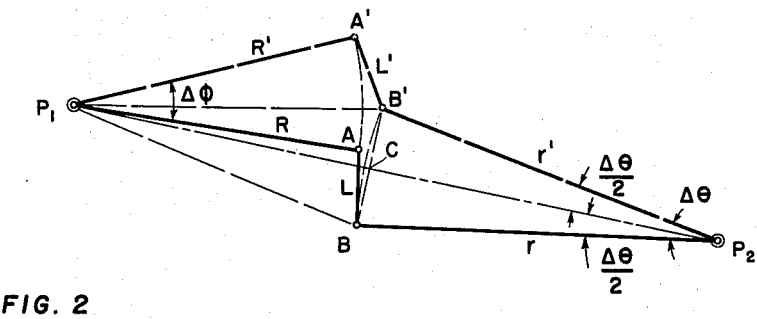
FIG. 2
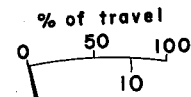
FIG. 1
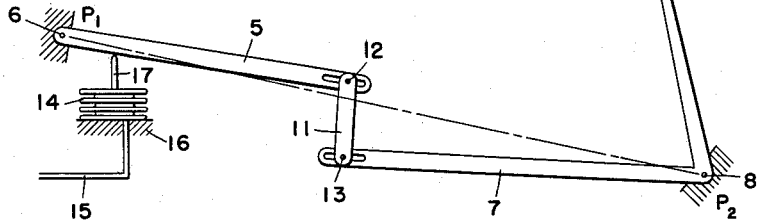
*INVENTOR.*
NATHANIEL B. NICHOLS
BY
D. Clyde Jones
ATTORNEY

United States Patent Office 2,718,794
Patented Sept. 27, 1955

2,718,794
LINKAGE FOR INDICATING AND CONTROLLING INSTRUMENTS

Nathaniel B. Nichols, Minneapolis, Minn., assignor to Taylor Instrument Companies, Rochester, N. Y., a corporation of New York Application May 31, 1951, Serial No. 229,047

3 Claims. (Cl. 74—516)

This invention relates to a multi-bar linkage for changing the ratio of an angular input motion of a driving bar to a resulting angular output motion of a second bar driven thereby, the linkage being of the type especially adapted for use in a temperature (pressure etc.) exhibiting and/or controlling instrument and the like when the driving bar may be positioned by an actuating element such as a bellows, Bourdon spring, etc.

In such instruments, the displacements of the actuating elements vary from element to element, due to manufacturing variations so that adjustments must be provided to cause the driven bar and its exhibiting means to be displaced the amount required by the chart or scale with which it cooperates.

Furthermore, the ratio between the driving force applied to the actuating element that positions the driving bar and the resulting angular displacement of this bar, tend to be non-linear. If this non-linearity were constant from instrument to instrument the scale (or chart) of the exhibiting means could be corrected accordingly. Since the amount of non-linearity varies from instrument to instrument, adjustment must be made in the linkage to reduce the effect on the exhibiting means of this variation in the non-linearity.

The present invention has for its purpose the production of a linkage which greatly simplifies the calibration of an instrument used for indicating, recording and/or controlling a variable condition such as temperature, pressure, liquid level, rate of flow, and the like.

The various features and advantages of this invention will appear from the detailed description and the claims when taken with the drawings in which Fig. 1 is a simplified disclosure of the present multi-bar linkage in an exhibiting device; and Fig. 2 is a diagram useful in explaining the linkage.

In Fig. 1 the invention is shown by way of example as embodied in an indicating or exhibiting instrument although it will be understood that the present linkage can be embodied in a wide variety of instruments or devices. In this embodiment, a primary or driving bar 5 is pivoted on a fixed pivot 6 while a second or driven bar 7 is pivoted on a fixed pivot 8, spaced from the first pivot. The driven bar has an index arm 9 secured thereto whereby the index arm is moved over a graduated scale 10 having a span or range from 0 to 100 as the driving bar is actuated. The free ends of bars 5 and 7 which swing in parallel planes are linked together by a third bar 11. The upper end (Fig. 1) of bar 11, is pivotally connected to bar 5 by pivot pin 12 adjustable in the slotted end of bar 5. Similarly the lower end of bar 11 is pivotally connected to bar 7 by the pivot pin 13 which is adjustable in the slotted end of bar 7.

The driving bar 5 is actuated by an external force applied thereto. As herein shown, the force is applied by a bellows 14 which responds to fluid under modulated pressure applied through pipe 15. This bellows has one of its ends fixed at 16 and has its other end movable to vary the position of its stud 17, thereby changing the angular position of the driving bar 5. The angular movement of bar 5 is effective through link 11 and the driven bar 7 to swing the index arm 9 a corresponding amount with respect to scale 10.

As such linkages are usually laid out, the procedure of calibration is entirely by trial and error. For example, if it is desired to calibrate the instrument for a range from 0 to 100 p. s. i., the first step might be to adjust the length of stud 17 to make the pointer 9 read 0 when the pressure is 0 p. s. i. This will be called the zero adjustment. On application of 100 p. s. i., the pointer will not generally read 100. If the reading is, say, less than 100, the ratio of effective lengths of arm 5 to arm 7 needs to be increased. By trial and error the instrument can be brought into calibration at 0 and 100 p. s. i. Adjustment to make the instrument read correctly at 0 and 100% of scale will be called adjusting the span. After this is accomplished, the instrument generally will not be in calibration at any other pressure such as at 50 p. s. i. Adjustments can then be made by trial and error to bring, say, both the 0 p. s. i. and 50 p. s. i. points in calibration. However, these adjustments would generally introduce some error into the reading at the 100 p. s. i. point. In readjusting the span some error will be introduced in the 50 p. s. i. reading.

In the linkage disclosed herein, once the span adjustment has been made, adjustments for error at other points of the scale can be made without the need for readjusting the span. This is accomplished by causing the arc traversed by pivot 13, when the pointer crosses the scale, to be bisected by the line connecting the centers of the fixed pivots 6 and 8 of arms 5 and 7 respectively. This will be shown by reference to Fig. 2 where:

$P_1$ is the center of the fixed pivot 6 of the driving arm 5.
$P_2$ is the center of the fixed pivot 8 of the driven arm.
A is the position of the center of pivot 12 when the pointer is at 0% scale reading.
A' is the position of the center of pivot 12 when the pointer is at 100% scale reading.
B is the position of the center of pivot 13 when the pointer is at 0% scale reading.
B' is the position of the center of pivot 13 when the pointer is at 100% scale reading.
C is point of intersection of lines BB' and $P_1P_2$.
$R=R'=$ distance between pivots 6 and 12 of the driving arm 5.
$r=r'=$ distance between pivots 13 and 8 of the driven arm 7.
$L'=L=$ distance between pivots 12 and 13 of the connecting link 11.
$L_0=$ distance between pivots 6 ($P_1$) and 8 ($P_2$)

$\Delta\phi$ is the angular displacement of the line connecting the centers of pivots 6 and 12 of arm 5 when the actuating element crosses the range. $\Delta\theta$ is the angular displacement of the line connecting the centers of pivots 8 and 13 of arm 7 when the pointer crosses the scale 10.

By definition: $\Delta\theta=$ angle $BP_2B'$. Assume angle $BP_2P_1=$ angle $P_1P_2B'$. Then angle $BP_2P_1=$ angle $P_1P_2B'=\Delta\theta/2$ and line BB' is bisected by line $P_1P_2$. Consequently distances $P_1B=P_1B'$ and triangles $P_1AB$ and $P_1A'B_1$ are identical. Since this is so and angle $AP_1A'=\Delta\phi$ then angle $AP_1A'=$ angle $AP_1B'+$ angle $B'P_1A'=\Delta\phi$ but angle $B'P_1A'$ $=$ angle $BP_1A$ because triangle $P_1AB$ is identical to triangle $P_1A'B$ substituting: $\Delta\phi=$ angle $AP_1B'+$ angle $BP_1A$ therefore $\Delta\phi=$ angle $BP_1B'$; angle $BP_1B'=\Delta\phi$ and angle $CP_1B=$ angle $CP_1B'=\Delta\phi/2$. By use of above and the definitions of sine and cotangent of angles $$\text{Distance } BC = r \sin \frac{\Delta\theta}{2}$$

$$L_0 = \text{distance } P_1C + \text{distance } CP_2$$

$$L_0 = r \sin \frac{\Delta\theta}{2} \cot \frac{\Delta\phi}{2} + r \sin \frac{\Delta\theta}{2} \cot \frac{\Delta\theta}{2}$$

Consequently, $$\frac{L_0}{r} = \sin\frac{\Delta\theta}{2}\left(\cot\frac{\Delta\phi}{2} + \cot\frac{\Delta\theta}{2}\right)$$

This equation shows that when $L_0$ and $\Delta\theta$ are fixed, as shown in Fig. 1, the value of $r$ depends only on the value of $\Delta\phi$. Moreover, when $r$ is adjusted so that the $\Delta\phi$ produced by a given actuating element causes the pointer 9 to traverse the scale 10, subsequent changes in the values of R and L will not change the span adjustment for R and L do not enter the last equation above which relates $\Delta\theta$ and $\Delta\phi$.

To clarify the significance of what has been said, refer again to Fig. 1 and assume that the instrument illustrated is to be calibrated. By zero adjustment and by changing the location of pivot 13 (length of $r$) the instrument is brought into adjustment at 0 and 100 p. s. i. After this is accomplished the reading is checked at some other point, usually 50 p. s. i. If the reading is in error at this pressure, the position of pivot 12 (length of R) is changed by a suitable amount and the instrument rezeroed as required. This procedure would be repeated until the exhibited error at 50 p. s. i. is satisfactorily small. Since pivot 13 (length $r$) is not changed in this process the span adjustment is unchanged and no further attention needs to be given to the exhibited reading at 100 p. s. i.

Of course, it will be understood that the disclosed linkage may be rearranged so that the arc traversed by pivot 12 when the pointer crosses the scale is caused to be bisected by the line connecting the centers of the fixed pivots 6 and 8. However, in this case, the instrument would be brought into adjustment at 100 p. s. i. by changing the location of pivot 12 while the position of pivot 13 would be changed to bring the instrument into adjustment at intermediate points of the span without further changing the effective length of bar 5 (R) or the position of pivot 12.

What I claim is:

1. In an arrangment of the class described, a linkage comprising a first bar mounted at one end on a fixed pivot to rotate in a given plane through an angle of displacement, a second bar mounted at one end on a second fixed pivot spaced from the first fixed pivot to rotate in a plane parallel to the given plane through a desired angle of displacement, a link pivotally connecting the remaining ends of said bars, means for changing the effective length of one of said bars, the desired angle of displacement of the other of said bars being bisected by a line connecting said fixed pivots, whereby the relationship between the angular displacements of the first and second bars is independent of the effective length of said one bar so that the effective length of said one bar with respect to said link can be changed without changing the relative displacements of said first and second bars.

2. In an arrangement of the class described, a linkage comprising a driving bar mounted at one end on a fixed pivot to swing in a given plane through a desired angle of displacement, a driven bar mounted at one end on a second fixed pivot spaced from the first fixed pivot to swing in a plane substantially parallel to said given plane through a desired angle of displacement, a third bar pivotally linking the remaining ends of the driving bar and the driven bar, means for changing the effective lengths of said bars, the desired angle of displacement of the driven bar being bisected by a line connecting said fixed pivots, whereby the relationship between the angular displacement of the driving bar $\Delta\phi$ and the angular displacement of the driven bar $\Delta\theta$ is given by $$\frac{L_0}{r} = \sin\frac{\Delta\theta}{2}\left(\cot\frac{\Delta\phi}{2} + \cot\frac{\Delta\theta}{2}\right)$$

where $L_0$ is the distance between the fixed pivots of the driving and driven bars and $r$ is the effective length of the driven arm.

3. In an arrangement of the class described, a linkage comprising a driving bar mounted at one end on a fixed pivot to swing through a desired angle of displacement, means for driving said bar, a driven bar mounted at one end on a second fixed pivot spaced from the first fixed pivot to swing through a desired angle of displacement, a third bar pivotally linking the remaining ends of the driving bar and the driven bar, means for changing the effective lengths of the driving and driven bars, the desired angle of displacement of the driven bar being bisected by a line connecting said fixed pivots, whereby the relationship between the angular displacements of the driving and driven bars is independent of the effective length of the driving bar so that the effective length of the driving bar and/or the third bar can be changed without changing the relative displacements of the driving and driven bars.

References Cited in the file of this patent

UNITED STATES PATENTS

| | | |
|---|---|---|
| 204,049 | Jones | May 21, 1878 |
| 308,129 | Buffum | Nov. 18, 1884 |
| 564,085 | Kingman | July 14, 1896 |
| 1,609,292 | Burch | Dec. 7, 1926 |
| 2,276,702 | Riparbelli | Mar. 17, 1942 |
| 2,453,560 | Westburg et al. | Nov. 9, 1948 |
| 2,594,136 | Di Maggio | Apr. 22, 1952 |